O. CARLSON.
MILK BOTTLE CAP REMOVER AND RETAINER.
APPLICATION FILED JAN. 26, 1920.
1,382,820.                                  Patented June 28, 1921.
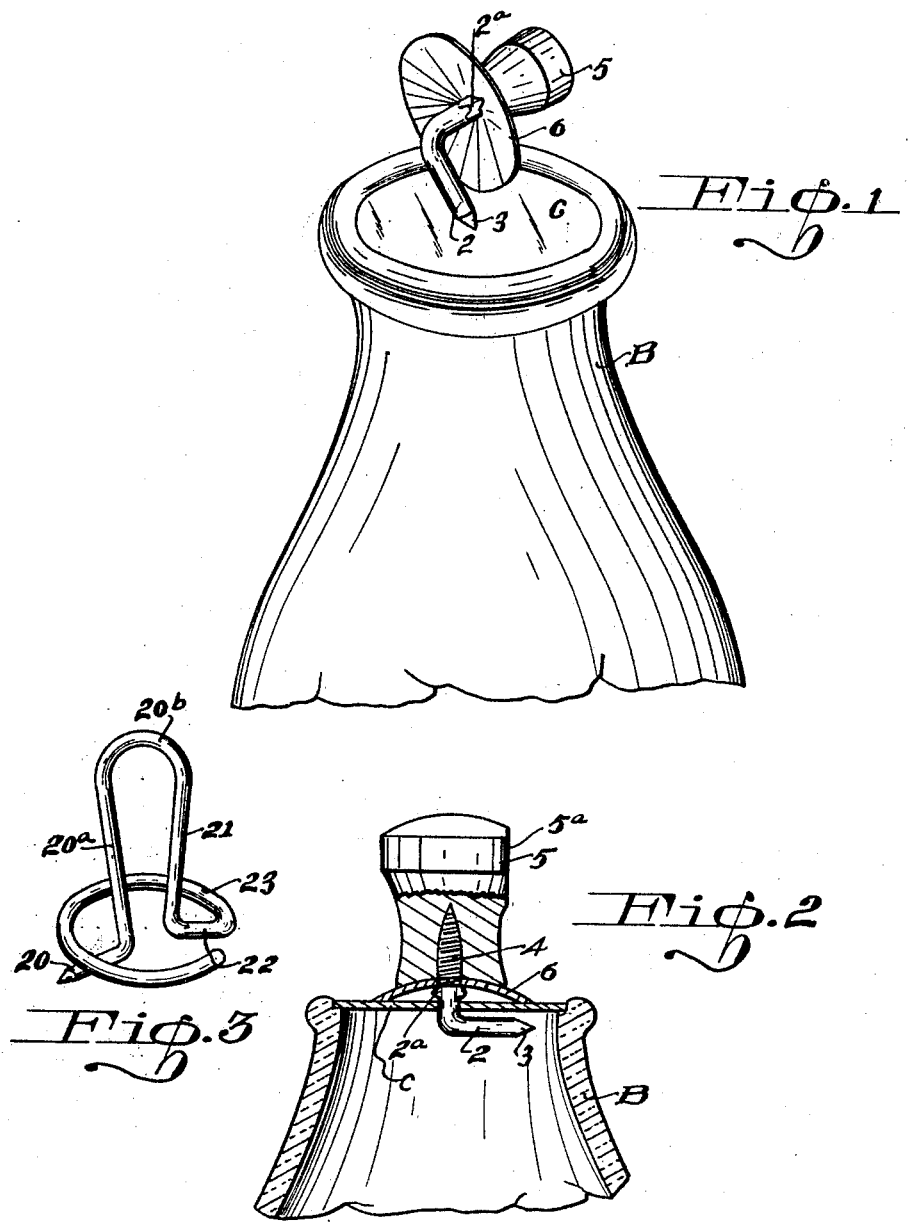
INVENTOR
Ole Carlson
By Hazard & Miller
Att'ys

UNITED STATES PATENT OFFICE.

OLE CARLSON, OF LOS ANGELES, CALIFORNIA.

MILK-BOTTLE-CAP REMOVER AND RETAINER.

1,382,820.  Specification of Letters Patent.  Patented June 28, 1921.

Application filed January 26, 1920. Serial No. 354,124.

*To all whom it may concern:*

Be it known that I, OLE CARLSON, a citizen of the United States, residing at Los Angeles, in the county of Los Angeles and State of California, have invented new and useful Improvements in Milk-Bottle-Cap Removers and Retainers, of which the following is a specification.

This invention relates to household utensils and particularly to a device for removing and retaining and reapplying the usual paper cap closures of milk bottles, and the invention consists of the construction, and combination and details an embodiment of which invention is illustrated in the accompanying drawings and described and claimed herein.

Figure 1 is a perspective of the upper portion of a milk bottle showing the application of the device to remove the cap therefrom.

Fig. 2 is a vertical central section through the mouth of the bottle showing the cap reapplied thereto.

Fig. 3 is a perspective of a modified form of the invention.

The device consists of an L-shaped hook or penetrating nib member 2 that may be of wire or other suitable material having a sharpened end forming a point 3, and an upwardly extending shank 4 which in Figs. 1 and 2 is shown as threaded and extended into a handle or knob portion 5 that is shown as flattened at 5$^a$ on the side coördinate to the pointed end 3 of the hook so as to indicate to the user the position of the point with respect to the body of the knob 5.

Preferably there is disposed just below the bottom end of the knob 5 a loose washer or plate 6 of rather smaller diameter than the mouth of the milk bottles as commonly made, and this washer is retained against displacement or loss by burring up the shank of the hook 2 as at 2$^a$.

This washer is preferably formed of sheet metal and is pressed so that it is of concavo-convex shape. It is arranged on the underside of the knob or handle 5 with its convex face uppermost, and by virtue of this arrangement, the edge portion of said disk bears against the top of the milk bottle cap or closure when the device is applied thereto.

In the application of this form of the invention the user has but to tilt the knob to the angle substantially as shown in Fig. 1 and force the pointed end 3 down through the paper cap C of the bottle B until the angular extension of the point passes through the body after which the knob can be pulled upwardly away from the bottle mouth and the transverse end 3 of the hook member will be brought into position against the bottom of the cap and the latter readily withdrawn from its seat in the bottle. The cap is retained on the hook member and may be reapplied to the bottle, as shown in Fig. 2, to close the same to protect the contents of the bottle.

A modified form of the invention is shown in Fig. 3 in which the device is made of an integral piece of wire having the hook end 20 bent laterally from the shank 20$^a$ which is extended upwardly and bent to form a handle 20$^b$. A downturned side 21 of the handle is provided with an angular outwardly extending bend 22 substantially in the plane of the hook end 20, and at the end of the arm 22 is formed an annulus 23 serving the same purpose as the washer or disk 6 of Fig. 2 in the replacement of a removed cap from a bottle.

Various changes may be made without departing from the spirit of my invention as claimed.

I claim:

A milk bottle cap removing and retaining device comprising a knob, an L-shaped member having its vertical leg threaded and seated in the lower portion of said knob, the horizontal leg of said L-shaped member being disposed a short distance below the lower end of the knob and the end of said horizontal leg being pointed, a concavo-convex disk loosely arranged on the vertical leg of the L-shaped member and disposed below the lower end of the knob, and a bur formed on the vertical leg of said L-shaped member below said disk.

In testimony whereof I have signed my name to this specification.

OLE CARLSON.